United States Patent [19]

Shuman

[11] Patent Number: 4,854,297
[45] Date of Patent: Aug. 8, 1989

[54] PORTABLE GRILL ASSEMBLY

[76] Inventor: Joseph L. Shuman, 2755 E. Bates Ave., Denver, Colo. 80210

[21] Appl. No.: 221,439

[22] Filed: Jul. 19, 1988

[51] Int. Cl.$^4$ .............................................. F24B 3/00
[52] U.S. Cl. .................................. 126/30; 126/25 A
[58] Field of Search ................ 126/25 A, 30, 29, 9 R; 99/339, 449, 450; 248/125, 156, 185, 291, 294

[56] References Cited
U.S. PATENT DOCUMENTS

| | | |
|---|---|---|
| 2,844,139 | 7/1958 | Lucas . |
| 2,912,973 | 11/1959 | Lucas . |
| 2,940,439 | 6/1960 | Bartels et al. . |
| 3,067,734 | 12/1962 | Lucas . |
| 3,152,536 | 10/1964 | Lucas . |
| 3,162,113 | 12/1964 | Tallaksen ......................... 126/30 X |
| 4,094,296 | 6/1978 | Beagley . |
| 4,553,525 | 11/1985 | Ruble . |

Primary Examiner—Randall L. Green
Attorney, Agent, or Firm—Fields, Lewis, Pittenger & Rost

[57] ABSTRACT

A stable, portable, and easily assembled cooking assembly is disclosed. The assembly includes arm means having a handle at one end, an outer support means at its other end and center pivoting means along its midsection. The center pivoting means is mounted on an upper end of a post means for pivotal movement thereabout at a first pivot point. The post means also has a lower end which is driven into the ground to secure the post means in an upright position. The upper end of the arm means also includes lock means for securing the arm means about the first pivot point at one of a plurality of differently angled positions. The assembly further includes a rigid suspension member having an upper end including outer pivoting means for pivotal engagement with and suspension from the outer support means of the arm means at a second pivot point. The suspension member also has a lower end for rigid attachment to an end edge of a food support.

20 Claims, 2 Drawing Sheets

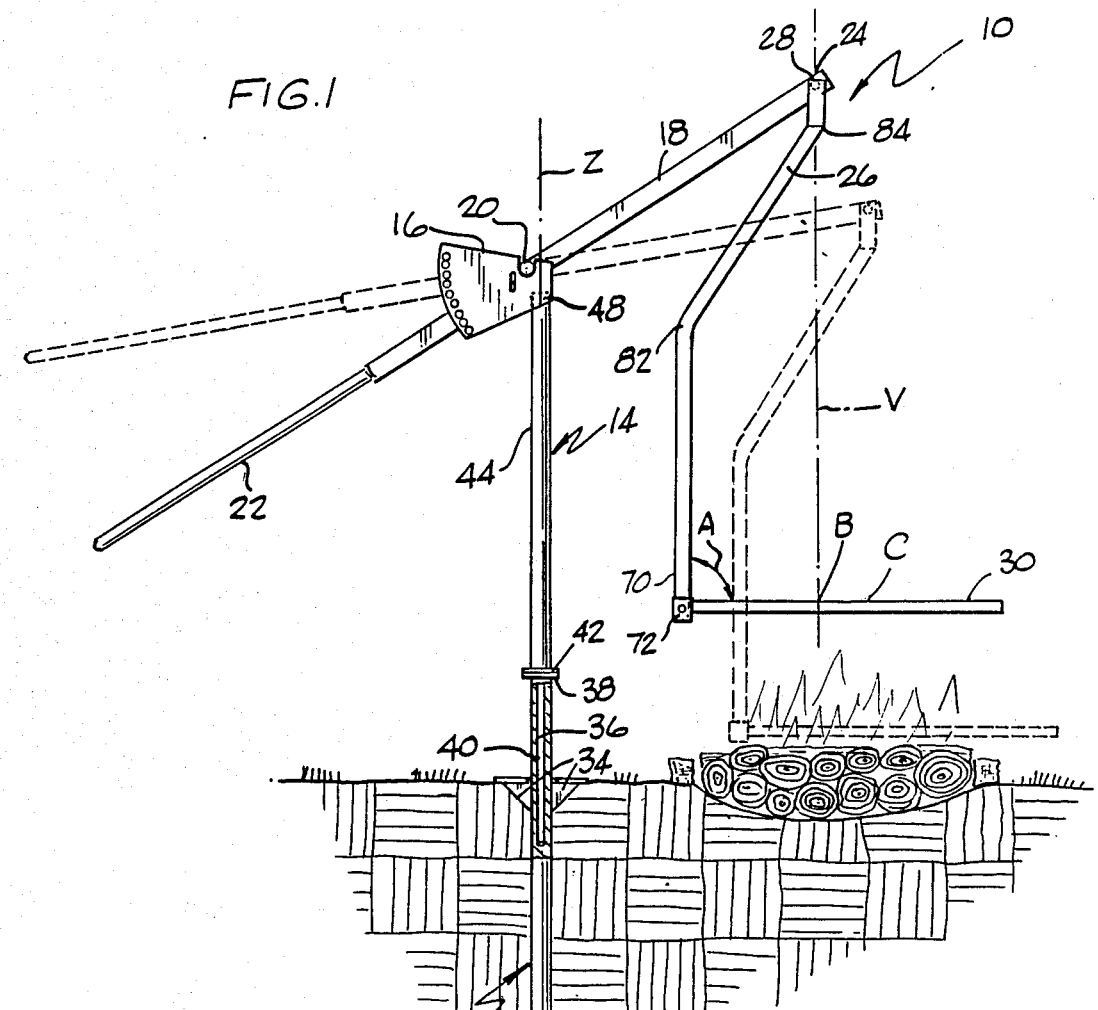

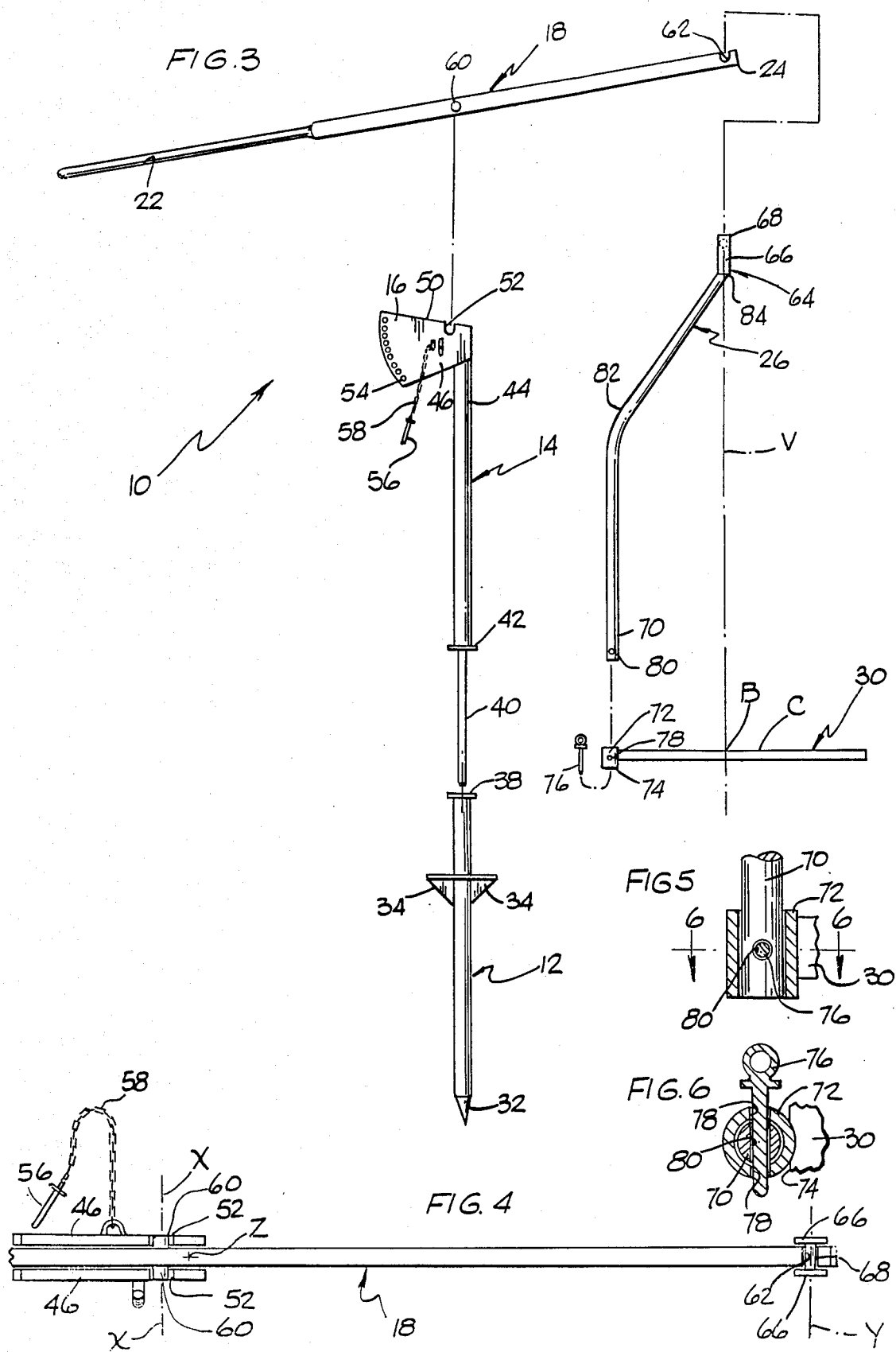

PORTABLE GRILL ASSEMBLY

TECHNICAL FIELD

The invention relates generally to apparatus for cooking food outdoors and, more particularly, to a portable, easily assembled apparatus for cooking food outdoors.

BACKGROUND ART

Due to the popularity of outdoor activities such as hunting and camping, numerous devices for cooking or grilling food over an open fire have been developed. One style of portable outdoor grill assembly which has become quite popular in recent years employs a pivoting arm which is pivotally mounted to the upper end of an upright post which is driven into the ground at its lower end. The grill for this assembly is typically attached to one end of the pivoting arm by either a chain-like member or a rigid member and the grill is conveniently raised and lowered over the campfire to control cooking as desired by simply pivoting the pivoting arm about its point of attachment to the upper end of the post.

U.S. Pat. No. 4,094,296 to Beagley discloses a portable grill of the aforementioned general type which includes a stake member having a first end formed into a point for driving into the ground and a second end formed with a flange extending substantially normal to the longitudinal axis of the stake member. The device further includes an adjustment member which is rotatably adapted to the stake member by an adapting means. The adjustment member is comprised of a first plate having a plurality of apertures formed in it in accordance with a preselected pattern to coact with a pin sized to fit through the apertures. An elongated arm member is pivotally secured to the plate and has a handle on one end and a first hook adapted to its other end. A chain having links is sized to coact with the first hook and hang therefrom. A second hook is adapted to the lower end of the chain from which cooking utensils such as a barbecue grill may be suspended.

U.S. Pat. Nos. 2,844,139; 2,912,973; 3,067,734 and 3,152,536 to D. D. Lucas also disclose portable barbecue grills which utilize a pivoting arm pivotally attached to an upright post for adjusting the height of a barbecue grill over a fire. Each of the barbecue grills is suspended from an end of the pivoting arm by a relatively rigid suspension member which is pivotally attached to an end of the pivoting arm. Each of these barbecue grills also utilizes a second pivoting arm in parallel relationship to the first pivoting arm for maintaining the grill in a horizontal position as the grill is moved vertically to and from the fire.

U.S. Pat. No. 2,940,439 to Bartles et al and U.S. Pat. No. 4,553,525 to Rubel disclose portable grills wherein the grill is attached to an end of an arm which is slidably attached to an upright post. The grill's vertical height above the campfire is adjusted by sliding the slidably attached arm up and down the upright post.

While all of the above grill assemblies disclosed in the aforementioned patents undoubtedly work as intended, there still remains a need for a portable grill assembly which is not complicated, resists tilting when food is placed upon the grill and which utilizes the pivoting arm concept which enables the grill's vertical height above the fire to be easily adjusted.

DISCLOSURE OF THE INVENTION

The present invention addresses the aforementioned concerns by providing a stable cooking assembly which is easily assembled and portable. The assembly includes a food support such as a barbecue grill for supporting food to be cooked or for supporting a cooking utensil in which food is cooked. The assembly further includes arm means having a midsection portion for mounting on an upright post means for pivotal movement of the arm means about a first pivot point. Lock means for securing the arm means at one of a plurality of differently angled positions about the first pivot point is also included. The arm means also has a support end portion from which suspension means for supporting the food support is suspended. The suspension means includes a rigid suspension member having an upper end for suspension from the support end portion and pivotal engagement therewith about a second pivot point. The suspension member also has a lower end for rigid attachment to an edge portion of the food support.

In a preferred embodiment, the post means includes lower upper and lower telescoping members. The lower telescoping member has a pointed end for driving into the ground to secure the member in an upright position. The upper telescoping member is sized to not only telescope with the lower telescoping member but is also rotatable with respect thereto so that the arm means can be rotated about the longitudinal axis of the upper and lower telescoping members.

In another preferred embodiment, the suspension member and food support are selectively weighted and configured so that a vertical line passing through the second pivot point also passes through the food support at a selectively located point referred to herein as the balance point. The selectively located point is preferably located proximate the geometric center of the food support so that food and/or cooking utensils can be easily located on or evenly about the balance point which will not cause the food support to tilt. By locating the balance point near the geometric center of the food support, almost all of the food support's surface can be used without causing the food support to tilt.

Another embodiment of the present invention additionally includes a cooking utensil such as a pot and/or pan which is selectively sized, configured and weighted to mount on the food support without causing the food support to tilt. The cooking utensil is also preferably sized and configured so that it cannot be mounted on the food support in a position that will cause the food support to tilt.

Yet a further embodiment includes pivoting means associated with both the first and second pivot points which permit movement at these points but substantially restrict such movement to pivotal movement about a horizontal axis. As such, twisting and lateral movement of the members which pivot about these points is minimized. Accordingly, an extremely stable cooking assembly is provided which will resist tilting when food is placed on the food support.

BRIEF DESCRIPTION OF THE DRAWINGS

Other features of this invention will appear in the following description and appended claims, reference being made to the accompanying drawings forming a part of the specification where like reference characters designate corresponding parts in the views.

FIG. 1 is a side elevational view of a portable grill assembly of the present invention which illustrates the assembly as it would appear when mounted in the ground and positioned above a campfire.

FIG. 2 is a top plan view of the grill assembly illustrated in FIG. 1.

FIG. 3 is an exploded side elevational view of the grill assembly illustrated in FIG. 1.

FIG. 4 is an enlarged, partial top plan view of the grill assembly of FIG. 1.

FIG. 5 is an enlarged partial side elevational view illustrating means for rigidly attaching the grill to the suspension member of the assembly of FIG. 1.

FIG. 6 is a cross-sectional view taken along lines 6—6 of FIGS. 5.

FIG. 7 is a partial side elevational view of an alternative top member of the present invention, the view also being partially broken away to illustrate the top member's removable attachment to the elongate member of the post means.

DETAILED DESCRIPTION

FIGS. 1 through 6 illustrate a portable, easily assembled, barbecue grill assembly 10 of the present invention. Assembly 10 generally includes an elongate post means including upper and lower telescoping members 12 and 14. Lower member 12 is driven into the ground to secure the assembly in an upright position. Upper member 14 of the post means includes top member 16 for supporting an arm means 18 for pivotal movement about an axis X at a first pivot point 20. Upper member 14 also includes lock means (not numbered) for securing arm means 18 about axis X at one of a plurality of differently angled positions. Arm means 18 has a handle 22 at one end and a support end portion or outer support means 24 at its other end. A rigid suspension member 26 is suspended from support end portion 24 and is pivotal therewith about a second horizontal axis Y at a second pivot point 28. Suspension member 26 is also rigidly attached at its lower end to a side of a barbecue grill 30.

As best illustrated in FIGS. 1 and 3, lower telescoping member 12 has a lower pointed end 32 which enables lower member 12 to be driven into the ground. Lower member 12 also has a pair of flange-like wing members 34, each of which extends outwardly from the midsection of lower member 12 at a right angle and each of which is also preferably driven in the ground as illustrated in FIG. 1 to prevent lower member 12 from twisting in the ground.

Lower member 12 also defines an elongated, cylindrically shaped bore 36 in its upper end 38 which is axially aligned with the longitudinal axis of member 12. Bore 36 is sized and configured to slidably receive a generally cylindrically shaped, lower telescoping extension 40 of upper member 14. Bore 36 is also sized to permit extension 40 to rotate therein.

Extension 40 is rigidly attached to an end 42 of an elongate portion 44 of upper member 14 and is also preferably integral therewith. Extension 40 also, as illustrated, projects outwardly from end 42 and is axially aligned with the longitudinal axis of elongate portion 44. Accordingly, when extension 40 is telescoped within bore 36 of lower member 12, the respective longitudinal axes of members 12 and 14 will be in alignment with each other about an axis referred to as axis Z herein.

Turning now to top member 16, it can be seen in FIG. 4 that top member 16 includes a pair of spaced, parallel plates 46 which are secured, preferably by welding, to an end 48 of elongate portion 44 of upper telescoping member 14. Plates 46 are spaced from one another to closely receive arm means 18 so that twisting and lateral movement of arm means 18 between plates 46 is minimized. Each plate 46 also has an upper edge 50 defining a U-shaped notch 52. As illustrated in FIG. 4, notches 52 are axially aligned with each other.

Plates 46 further define a plurality of pairs of axially aligned apertures 54. Each axially aligned pair of apertures 54 is sized to receive and cooperate with a pin means 56 which, as best illustrated in FIG. 2, is attached to one of plates 46 by a chain 58. The plurality of axially aligned pairs of apertures 54 are formed in the plates in accordance with a preselected pattern so as to define a generally arcuate shaped row of apertures in each plate. This preselected pattern of apertures in conjunction with pin means 56 provides the aforementioned lock means (not numbered) which enables one to adjust the angle at which arm means 18 is positioned or locked about axis X, as will be explained in more detail below.

FIGS. 1 through 4, particularly FIG. 4, illustrate that the midsection of arm means 18 is provided with a center pivoting means (not numbered) which includes a pair of cylindrically shaped, axially aligned pivot pins 60. Pivot pins 60 project outwardly at right angles from opposite sides of the arm means and are sized to slidably mount and pivot within axially aligned U-shaped notches 52 (also referred to herein as center support means) so that, when so mounted, arm means 18 can be easily pivoted about axis X at pivot point 20, as illustrated.

Turning now to FIGS. 3 and 4, it can be seen that support end portion 24 of arm means 18 includes a U-shaped groove 62 extending transversely across the longitudinal axis of arm means 18. FIGS. 3 and 4 also illustrate that an upper or first end 64 of suspension member 26 defines an outer pivoting means (not numbered) which includes a pair of spaced parallel members 66. Members 66 are connected by a cylindrically shaped rod 68 extending perpendicularly between members 66. Members 66 are spaced from one another and rod 68 is sized to slidably mount within U-shaped groove 62 so that rod 68 can pivot within groove 62, thereby enabling suspension member 26 to maintain its angular position with respect to the ground as it is moved to and from the ground by pivoting arm means 18 about axis X. Spaced members 66 are also spaced from one another to closely receive arm means 18 so that twisting or lateral movement of suspension member 28 about arm means 18 is minimized, i.e., so pivotal movement of suspension member 26 at pivot point 28 occurs only about horizontal axis Y.

Suspension member 26 further includes a lower or second end 70 for rigid attachment to grill 30. The means for rigidly attaching lower end 70 to grill 30 includes, as best illustrated in FIGS. 5 and 6, a tubular-shaped member 72 which is attached to grill 30 at an edge 74 thereof. Tubular-shaped member 72 is sized and configured to closely receive end 70 of suspension member 26 and is attached thereto by a pin means 76 which is sized and configured to extend through a pair of axially aligned first bores 78 provided in tubular-shaped member 72 and a second bore 80 extending through end 70.

As illustrated in the figures, suspension member 26 is also preferably rigidly attached to grill 30 at a right angle A to facilitate use of the grill's entire surface. If suspension member 26 were attached to grill 30 at an acute angle, the lower end of suspension member 26 would extend over part of the surface of grill 30, thereby partially obstructing this portion of the grill and, as such, reducing the amount of usable space on grill 30. Such an acute angle attachment would thereby severely limit the use of and the placement of tall pots and pans on the grill.

Suspension member 26, as illustrated, is also selectively configured or shaped with a first bend 82 and a second bend 84 so that suspension member 26 has enough weight to counter balance the weight of grill 30 so that the grill 30 assumes a horizontal position, as illustrated, when the two members, i.e., suspension member 26 and grill 30 are rigidly attached to each other and suspended from pivot point 28.

Suspension member 26 and grill 30 are also selectively weighted and configured so that a vertical line V passing through second pivot point 28 passes through the grill at a selectively located point which is referred to herein as balance point B. By selectively locating and marking the balance point, food can be easily placed on or evenly about the balance point without causing the grill to tilt. Grill 30 will not tilt with food placed on or evenly about the balance point because the balance point is in line with the vertical center of gravity of rigidly attached suspension member 26 and grill 30. As used herein, the vertical center of gravity is defined as the vertical line about which the weight of suspended grill 30 and suspension member 26 is uniformly distributed. This vertical center of gravity is identified in the figures by vertical line V and, as illustrated, it extends from pivot point 28 to balance point B.

The grill and suspension member's balance point should also preferably be located proximate or as close as possible to the grill's geometric center which is identified by point C in the illustrated embodiment. This enables food to be placed on the grill's entire surface without causing the grill to tilt.

As one might imagine, different embodiments of the present invention may require differently shaped suspension members to locate the balance point as close as possible to the grill's geometric center. For example, some embodiments of the present invention may require use of an S-shaped suspension member wherein the upper half of the S-shape of the suspension member counter balances the bottom half of the S-shape of the suspension member, thereby keeping the balance point of the rigidly attached suspension member and grill close to the grill's geometric center assuming, of course, that the grill is relatively evenly balanced itself about its geometric center.

In addition to the S-shape and the shape illustrated for suspension member 26, other shapes such as a bowed or arcuately shaped suspension member may be desirable for certain embodiments of the present invention. Moreover, in some situations it may be possible to even employ a straight suspension member. However, a straight suspension member would probably have to be attached to the grill at an acute angle which, as previously mentioned, would probably be undesirable since it would most likely obstruct part of the grill's surface.

To assemble and use portable grill assembly 10, lower telescoping member 12 is driven into the ground until flange-like wing members 34 fully penetrate the ground. Upper telescoping member 14 is then mounted on lower telescoping member 12 by inserting extension 40 of upper member 14 into bore 36 defined in end 38 of lower member 12. Arm means 18 is then mounted on upper member 14 by slidably inserting pivot pins 60 into notches 52 of upper member 14. Grill 30 may then be rigidly attached to lower end 70 of suspension member 26 by inserting end 70 into tubular-shaped member 72, aligning bores 78 and 80 of member 72 and end 70 and inserting pin means 68 through the aligned bores. Suspension member 26 with grill 30 rigidly attached thereto may now be suspended from end portion 24 of arm means 18 by slidably mounting rod 68 of suspension member 26 into groove 62 of arm means 18. Arm means 18 can then be positioned about axis X at any one of a plurality of selected angles by pivoting arm means 18 about axis X to the desired position and then inserting pin means 56 into the appropriate pair of apertures 54 maintaining arm means 18 in the selected position. Pin means 56 maintains the arm means in the selected position by preventing or restraining arm means 18 from pivoting upwardly through the pair of spaced parallel plates 46. When it is desired to adjust the vertical height of grill 30 as such is illustrated in phantom in FIG. 1, one simply removes pin means 56 from its present pair of apertures 54 and pivots arm means 18 about axis X until grill 30 is positioned at its new desired height above the ground. Pin means 56 is then inserted into the appropriate pair of apertures 54 for maintaining grill 30 at the new desired height.

Grill 30 can also be moved horizontally (i.e., to and from a campfire) by simply grabbing handle 22 and rotating arm means 18 about longitudinal axis Z of the post means. This direction of movement is indicated by the arrows in FIG. 2. Such rotational movement is possible since, as previously mentioned, extension 40 of upper telescoping member 14 is rotatable within bore 36 of lower telescoping member 12.

Those skilled in the art of cooking assemblies will appreciate that the cooling assembly of the present invention is highly portable and easily assembled. It will also be appreciated that the rigid attachment of grill 30 to suspension member 26 stabilizes the grill in the sense that it will resist tilting when food is placed on it. Grill stability is further enhanced by the illustrated pivoting means which allow pivotal movement about pivot points 20 and 28 but only about horizontal axes X and Y, respectively. In addition, it will be appreciated that grill stability can be even further enhanced by selectively locating and marking the balance point of the rigidly attached suspension member and grill. This makes it easy to locate and place food on or evenly about the balance point which, if so located, will not cause the grill to tilt.

FIG. 7 illustrates an alternative top member 100 which is identical to top member 16 except that top member 100 is slidably attachable to end 48 of elongate member 44, i.e., instead of being permanently affixed to end 48 as top member 16 is. Top member 100 includes a tubular-shaped member 102 defining a bore 104 which is sized and configured to slidably receive end 48. Bore 104 can also be sized to rotatably engage free end 48. This would obviate the need to make telescoping upper member 14 rotatable with respect to lower member 12 since this would provide an alternative means for rotating arm means 18 about axis Z. Use of top member 100 may be desirable in certain situations because it enables upper member 14 to be manufactured in two pieces, thereby making the cooking assembly even more portable and easier to pack or store in a motor vehicle or even in a back pack.

The invention has been described in detail with reference to particular embodiments thereof, but it will be understood the various modifications can be affected within the spirit and scope of this invention.

What is claimed is:

1. A cooking assembly comprising:
    a food support;
    upright post means;
    arm means having a support end portion and a midsection portion for mounting on said upright post means for pivotal movement of said arm means about a first pivot point;
    lock means for securing said arm means at one of a plurality of different angled positions about said first pivot point; and
    suspension means for suspending said food support from said support end portion, said suspension means including a single rigid one-piece suspension member having an upper end supported for free pivotal movement from said support end portion about a second pivot point, said suspension member also having a lower end rigidly attached to an edge portion of said food support which extends under said second pivot, said suspension member and food support being free to pivot at said second pivot while food is placed on said food support and during cooking to maintain said food support in a substantially horizontal position.

2. A cooking assembly as claimed in claim 1 wherein the pivotal movement of said arm means about the first pivot point is substantially about a horizontal axis to minimize twisting and lateral movement of said arm means with respect to said post means.

3. A cooking assembly as claimed in claim 1 wherein said pivotal movement about the second pivot point is substantially about a horizontal axis to minimize twisting and lateral movement of said suspension member with respect to said arm means.

4. A cooking assembly as claimed in claim 1 further comprising a cooking utensil which is selectively sized, configured and weighted to mount on said food support without causing said food support to tilt.

5. A cooking assembly as claimed in claim 1 wherein said food support is rigidly attached to said lower end at a right angle.

6. A cooking assembly as claimed in claim 5 wherein said rigid suspension member is shaped to extend down and out in an offset relation between said second pivot point and the point of rigid attachment to said food support.

7. A cooking assembly as claimed in claim 1 wherein said food support is positioned below said second pivot point so that a vertical line passing through said second pivot point also passes through said food support when said food support is suspended from said second pivot point by said suspension means.

8. A cooking assembly as claimed in claim 7 wherein said suspension member and food support are selectively weighted and configured so that the vertical line passing through said second pivot point passes through said food support at a selectively located point proximate the geometric center of the food support.

9. A cooking assembly comprising:
    a food support;
    arm means for pivotal movement about a first pivot point, said arm means having a handle at one end, outer support means at its other end and center pivoting means at a location along its midsection;
    post means having a lower end for driving into the ground to secure said post means in a upright position, said post means also having an upper end including center support means for supporting and pivotally engaging said center pivoting means of said arm means so that said arm means is pivotable about said first pivot point, said upper end further including lock means for securing said arm means about said first pivot point at one of a plurality of differently angled positions; and
    suspension means for suspending said food support from said outer support means of said arm means, said suspension means including a single rigid one-piece suspension member having an upper end supported for free pivotal movement from said support outer support means about a second pivot point, said suspension member also having a lower end rigidly attached to an edge portion of said food support so that said food support is located below said second pivot point when said food support is rigidly attached to said suspension member and said suspension member is suspended from said outer support means, said suspension member and food support being free to pivot at said second pivot while food is placed on said food support and during cooking to maintain said food support in a substantially horizontal position.

10. A cooking assembly as claimed in claim 9 wherein said food support is a barbecue grill.

11. A cooking assembly as claimed in claim 9 wherein said lock means includes a pair of spaced parallel plates and wherein said center support means includes a pair of axially aligned U-shaped notches defined by said plates with each plate defining one of said notches and wherein said center pivoting means includes a pair of axially aligned cylindrically shaped pivot pins extending outwardly from opposite sides of said arm means, said pins being sized to slidably mount within said notches so that said arm means is pivotable about said first pivot point.

12. A cooking assembly as claimed in claim 11 wherein said parallel plates are spaced from one another to closely receive said arm means so that lateral movement of said arm means between said plates is minimized.

13. A cooking assembly as claimed in claim 9 wherein said lock means includes:
    a pair of spaced parallel plates with at least one plate defining a plurality of apertures formed therethrough in accordance with a preselected pattern; and
    pin means sized to cooperate with said apertures for removable positioning in a selected aperture.

14. A cooking assembly as claimed in claim 9 wherein said post means includes upper and lower telescoping members, said upper telescoping member being rotatable with respect to said lower telescoping member so that said arm means is rotatable about the longitudinal axis of said members.

15. An cooking assembly as claimed in claim 9 wherein said rigid suspension member is selectively configured with a bend located at a location along said suspension member's midsection.

16. A cooking assembly as claimed in claim 9 wherein said food support is positioned below said second pivot point so that a vertical line passing through said second pivot point also passes through a point proximate the geometric center of said food support when said food support is suspended from said second pivot point by said suspension means.

17. A cooking assembly as claimed in claim 9 wherein said upper end of said post means includes a top member and an elongate portion, said top member including said lock means and said center support means and further defining a bore for slidably receiving a free end of said elongate portion.

18. A cooking assembly as claimed in claim 17 wherein said bore of said top member is sized and configured so that said top member is rotatable with respect to said elongate portion.

19. A cooking assembly comprising:
a food support;
arm means for pivotal movement about a first pivot point, said arm means having a handle at one end, outer support means at its other end and center pivoting means at a location along its midsection;
post means having a lower end for driving into the ground to secure said post means in an upright position, said post means also having an upper end including center support means for supporting and pivotally engaging said center pivoting means of said arm means so that said arm means is pivotable about said first pivot point, said upper end further including lock means for securing said arm means about said first pivot point at one of a plurality of differently angled positions;
suspension means for suspending said food support from said outer support means of said arm means, said suspension means including a single rigid suspension member having an upper end including outer pivoting means for suspension from said outer support means and pivotal movement about a second pivot point, said suspension member also having a lower end rigid attachment to an edge portion of said food support so that said food support is located below said second pivot point when said food support is rigidly attached to said suspension member and said suspension member is suspended from said outer support means; and
said outer support means including a U-shaped groove extending transversely across the longitudinal axis of said arm means and wherein said outer pivoting means of said suspension member includes a pair of spaced parallel members which are connected by a cylindrically shaped rod extending perpendicularly between said members, said members being spaced and said rod being sized to slidably mount within said U-shaped groove so that said rod is pivotal within said groove but only pivotal about a horizontal axis so that twisting and lateral movement of said suspension member between said pair of spaced parallel members are minimized, thereby stabilizing said food support so that tilting of said food support is minimized when food is placed on said food support.

20. A cooking assembly comprising:
a food support;
arm means for pivotal movement about a first pivot point, said arm means having a handle at one end, outer support means at its other end and center pivoting means at a location along its midsection;
post means having a lower end for driving into the ground to secure said post means in an upright position, said post means also having an upper end including center support means for supporting and pivotally engaging said center pivoting means of said arm means so that said arm means is pivotable about said first pivot point, said upper end further including lock means for securing said arm means about said first pivot point at one of a plurality of differently angled positions;
suspension means for suspending said food support from said outer support means of said arm means, said suspension means including a single rigid suspension member having an upper end including outer pivoting means for suspension from said outer support means and pivotal movement about a second pivot point, said suspension member also having a lower end rigid attachment to an edge portion of said food support so that said food support is located below said second pivot point when said food support is rigidly attached to said suspension member and said suspension member is suspended from said outer support means;
said food support being a barbecue grill;
rigid attachment means for attaching said suspension means to said barbecue grill, said rigid attachment means including a tubular shaped member rigidly attached to an edge portion of said grill, said tubular shaped member being sized and configured to closely receive said lower end of said suspension member, said tubular member also defining a first bore extending therethrough which is sized and configured to align with a second bore extending through said lower end of said suspension member; and
pin means sized and configured to extend through said first and second bores when said bores are aligned so as to rigidly attach said barbecue grill to said lower end of said suspension member.

* * * * *